United States Patent
West et al.

(10) Patent No.: US 9,654,521 B2
(45) Date of Patent: May 16, 2017

(54) ANALYSIS OF MULTI-MODAL PARALLEL COMMUNICATION TIMEBOXES IN ELECTRONIC MEETING FOR AUTOMATED OPPORTUNITY QUALIFICATION AND RESPONSE

(71) Applicant: International Business Machines Corporation, Armonk, NY (US)

(72) Inventors: Frances W. West, Newton, MA (US); Elizabeth V. Woodward, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 511 days.

(21) Appl. No.: 13/803,315

(22) Filed: Mar. 14, 2013

(65) Prior Publication Data
US 2014/0282089 A1 Sep. 18, 2014

(51) Int. Cl.
*H04L 29/06* (2006.01)

(52) U.S. Cl.
CPC .................................. *H04L 65/403* (2013.01)

(58) Field of Classification Search
CPC . G06Q 10/10; G06F 3/0481; G06F 17/30864; G06F 17/30867; H04N 7/15; H04L 12/1813; H04L 12/581; G10L 15/26; G10L 15/22; G06K 9/627; G06K 9/00268; G06K 9/00302; G06K 9/00671
See application file for complete search history.

(56) References Cited

U.S. PATENT DOCUMENTS 5,717,438 A 2/1998 Kim et al.
8,321,582 B2 11/2012 Katis et al.
(Continued)

OTHER PUBLICATIONS

Bettina et al., "STORIES In Time: a Graph-Based Interface for News Tracking and Discovery," 2009 IEEE/WIC/ACM International Conference on Web Intelligence and Intelligent Agent Technology—Workshops; 4 pages.
(Continued)

*Primary Examiner* — Jeffrey A Gaffin
*Assistant Examiner* — Mandrita Brahmachari
(74) *Attorney, Agent, or Firm* — Cantor Colburn LLP; William Stock

(57) ABSTRACT

A mechanism is provided for a time data capsule from an electronic conference. Operations include identifying meeting input sources related to the electronic conference, capturing respective data of the meeting input sources from a start through an end of the electronic conference, and maintaining and creating timestamps for the respective data that is captured. The timestamps are associated with the respective data. Operations include aligning the respective data along a timeline according to the timestamps associated with the respective data from the meeting input sources, converting the respective data into text equivalents and/or text descriptions with the timestamps retained, and identifying a trigger during the electronic conference that causes a timebox to be created with a beginning and an ending time. The operations include extracting the respective data for the timestamps that correspond to the timebox, and creating a package with the extracted respective data from the meeting input sources.

20 Claims, 11 Drawing Sheets

(56) References Cited

U.S. PATENT DOCUMENTS

| | | | |
|---|---|---|---|
| 2005/0015286 A1* | 1/2005 | Rudnik | H04N 5/9201 |
| | | | 348/143 |
| 2005/0038814 A1 | 2/2005 | Iyengar et al. | |
| 2005/0164725 A1* | 7/2005 | Naito | G06F 17/30241 |
| | | | 455/517 |
| 2007/0174255 A1* | 7/2007 | Sravanapudi et al. | 707/3 |
| 2007/0201675 A1* | 8/2007 | Nourbakhsh | H04M 3/5175 |
| | | | 379/265.01 |
| 2007/0300271 A1* | 12/2007 | Allen | H04N 5/232 |
| | | | 725/93 |
| 2009/0327896 A1 | 12/2009 | Pall et al. | |
| 2011/0090822 A1* | 4/2011 | Lee | H04M 3/56 |
| | | | 370/260 |
| 2011/0239119 A1 | 9/2011 | Phillips et al. | |
| 2012/0102021 A1 | 4/2012 | Hill et al. | |
| 2012/0109875 A1 | 5/2012 | Sundaram et al. | |
| 2012/0124149 A1 | 5/2012 | Gross et al. | |
| 2012/0150863 A1* | 6/2012 | Fish et al. | 707/741 |
| 2012/0162350 A1 | 6/2012 | Lee et al. | |
| 2012/0233155 A1* | 9/2012 | Gallmeier et al. | 707/722 |
| 2013/0108029 A1* | 5/2013 | Blewett | H04M 3/563 |
| | | | 379/67.1 |

OTHER PUBLICATIONS

Luz et al., "Compact Visualization of Multimedia Interaction Records," IEEE Computer Society, Proceedings of the Seventh International Conference on Information Visualization (IV'03); 1093-9547/03 $17.00 @ 2003 IEEE; 6 pages.

Pradhan et al., "Modified Timeboxing Process for Proper Utilization of Resources", Int'l Conf. on Computer & Communication Technology, ICCCT, 2010, 3 pages.

* cited by examiner

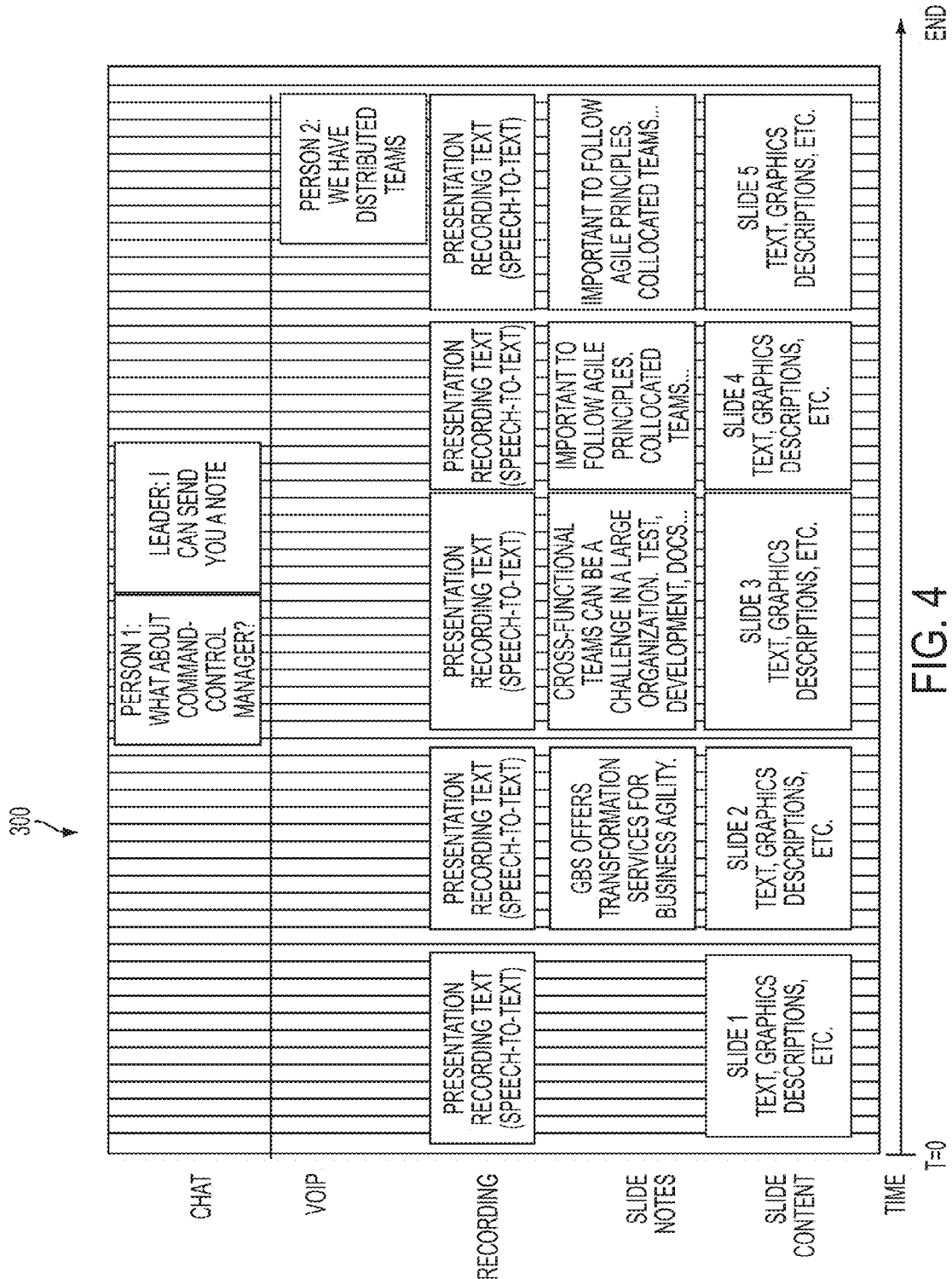

FIG. 5 500

Select at least one of the following for your package:

1) Interactions by person [ indicate person ]
2) Interactions by role [ indicate role ]
3) Attitude [Those interested | Those not interested]
4) Interactions related to topic [ indicate topic (command-control)]
5) Customers who provided comments
6) Commitments to take action
...

505

Search for additional linkages:
 Social media/network site A
 Social media/network site B
 Social media/network site C

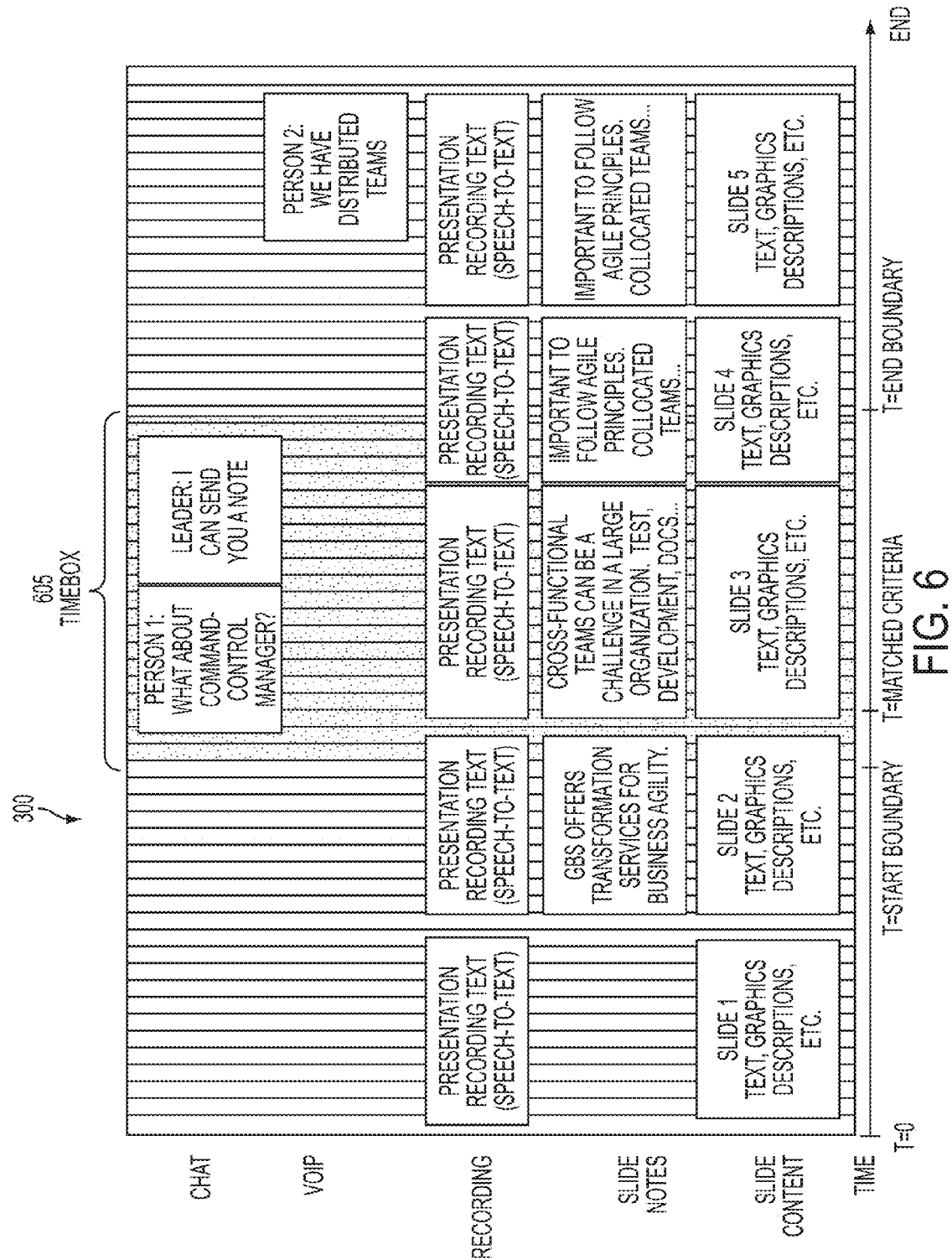

FIG. 8 800

Slide presentation is uploaded to the computer (via the software application) and/or to the conferencing server 802

↓

Extract content from the uploaded slide presentation 804

↓

Initiate related activities of the meeting input sources 806

↓

Capture all related activities of the meeting input sources and then timestamp these activities which includes timestamping the clicking through the slide presentations, translations, speech to text/chat, raising hands, video, audio, etc. 808

↓

Complete processing which includes conversions and timestamps for input data of the various meeting input sources 810

↓

Synchronize conversions from the multiple meeting input sources to text and the timestamp all converted data for correlation 812

↓

Create timeline alignment chart across of all data from the multiple meeting input sources 814

US 9,654,521 B2

ANALYSIS OF MULTI-MODAL PARALLEL COMMUNICATION TIMEBOXES IN ELECTRONIC MEETING FOR AUTOMATED OPPORTUNITY QUALIFICATION AND RESPONSE

BACKGROUND

The present disclosure relates to providing a data capsule for a designated time period in an electronic conference.

Electronic conferencing (also referred to as web conferencing, video conferencing, and virtual meetings) refers to a service and platform that allows conferencing events to be shared with remote locations. These are sometimes referred to as webinars. In general the service is made possible by Internet technologies, or local area networks (LAN) particularly on TCP/IP connections. The service allows real-time point-to-point communications as well as multicast communications from one sender (e.g., a host) to many receivers (participants). Video conferencing offers information of text-based messages, voice chat, video chat, slide show presentations, etc., to be shared simultaneously, across geographically dispersed locations.

Particularly, the following are typical features of web or video conferencing. Slide show presentation is a feature where images are presented to the audience, and markup tools and a remote mouse pointer are used to engage the audience while the presenter discusses slide content. Live or streaming video is when full motion webcam, digital video camera, or multi-media files are pushed to the audience. VoIP is real time audio communication through the computer via use of headphones and speakers. Web tours is a feature where URLs, data from forms, cookies, scripts and session data can be pushed to other participants enabling them to be pushed though web based logons, clicks, etc., and allows the presenter to demonstrate websites where users themselves can also participate. Meeting recording (video and audio) is when presentation activity is recorded on the client side or server side for later viewing and/or distribution. Whiteboard with annotation allows the presenter and/or attendees to highlight or mark items on the slide presentation, or simply make notes on a blank whiteboard. Text chat is a feature allowing live question and answer sessions, limited to the people connected to the meeting. Text chat may be public (echoed to all participants) or private (between 2 participants). Polls and surveys are features that allow the presenter to conduct questions with multiple choice answers directed to the audience. Screen sharing, desktop sharing, and/or application sharing is where participants can view anything the presenter currently has shown on her screen.

SUMMARY

According to an embodiment, a method of providing a time data capsule for a designated time period in an electronic conference is provided. The method includes identifying meeting input sources related to the electronic conference, and capturing respective data of the meeting input sources from a start through an end of the electronic conference, at least one of maintaining and creating timestamps for the respective data that is captured. The timestamps are associated with the respective data. The method includes aligning by a computer the respective data of the meeting input sources along a timeline according to the timestamps respectively associated with the respective data from the meeting input sources, converting the respective data of the meeting input sources into at least one of text equivalents and text descriptions with the timestamps retained, and identifying a trigger during the electronic conference that causes a timebox to be created, where the timebox has a beginning time and an ending time. The method includes extracting the respective data of the meeting input sources for the timestamps that correspond to the timebox resulting in extracted respective data, and creating a package comprising the extracted respective data from the meeting input sources in which the extracted respective data occurred during the timebox initiated by the trigger.

According to an embodiment, a computer program product for providing a time data capsule for a designated time period in an electronic conference is provided. The computer program product includes a computer readable storage medium having program code embodied therewith, and the program code is executable by a computer to perform operations. The operations include identifying meeting input sources related to the electronic conference, and capturing respective data of the meeting input sources from a start through an end of the electronic conference, at least one of maintaining and creating timestamps for the respective data that is captured. The timestamps are associated with the respective data. The operations include aligning by the computer the respective data of the meeting input sources along a timeline according to the timestamps respectively associated with the respective data from the meeting input sources, converting the respective data of the meeting input sources into at least one of text equivalents and text descriptions with the timestamps retained, and identifying a trigger during the electronic conference that causes a timebox to be created, where the timebox has a beginning time and an ending time. The operations include extracting the respective data of the meeting input sources for the timestamps that correspond to the timebox resulting in extracted respective data, and creating a package comprising the extracted respective data from the meeting input sources in which the extracted respective data occurred during the timebox initiated by the trigger.

According to an embodiment, an apparatus for providing a time data capsule of a designated time period in an electronic conference is provided. The apparatus includes memory comprising computer-executable instructions, and a processor executing the computer-executable instructions, where the computer-executable instructions, when executed by the processor, cause the processor to perform operations.

The operations include identifying meeting input sources related to the electronic conference, and capturing respective data of the meeting input sources from a start through an end of the electronic conference, at least one of maintaining and creating timestamps for the respective data that is captured. The timestamps are associated with the respective data. The operations include aligning by the computer the respective data of the meeting input sources along a timeline according to the timestamps respectively associated with the respective data from the meeting input sources, converting the respective data of the meeting input sources into at least one of text equivalents and text descriptions with the timestamps retained, and identifying a trigger during the electronic conference that causes a timebox to be created, where the timebox has a beginning time and an ending time. The operations include extracting the respective data of the meeting input sources for the timestamps that correspond to the timebox resulting in extracted respective data, and creating a package comprising the extracted respective data from the meeting input sources in which the extracted respective data occurred during the timebox initiated by the trigger.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 illustrates the timeline alignment in which the input data of each meeting source is converted to text equivalents and/or text descriptions with timestamps retained (if the input data is not originally text) according to an embodiment.

FIG. 5 illustrates a display box in which the user inputs criteria for triggering the start/creation of the timebox (when the criteria matches the input data from the meeting input sources) according to an embodiment.

FIG. 6 illustrates searching all of the meeting data from the meeting input sources to identify a match (i.e., matched content) to the criteria for creating the timebox according to an embodiment.

FIG. 8 illustrates a flow diagram of processing input data from meeting input sources of the electronic conference to create the timeline alignment according to an embodiment.

DETAILED DESCRIPTION

The present disclosure provides embodiments in the area of electronic conferencing or virtual meetings (including teleconferences, webinars, virtual conferences, e-meetings, etc.). Embodiments describe a method for creating a data capsule of an important period in a meeting based on defined criteria that allows correlation of relevant, time-boxed data across multiple sources of information available in a virtual meeting. Embodiments also describe a method for identifying and capturing additional information related to a time period of a (particular) discussion by using keywords within the timebox as search terms for other queries.

When hosting an electronic conference to identify potential sales opportunities, business representatives hosting the call take note of which clients are asking questions, have expressed interest, are responding negatively to the presentation, or are completely lacking in response. They then analyze the discussion and look for opportunities to follow-up with potential opportunities using a personalized approach. Unfortunately, this is currently a manually intensive process that requires someone to take accurate notes of who is making comments, the comment that was made, the part of the presentation being discussed at the time, committed follow-on activities, any activities happening in the chat session in parallel, and reactions to what is being said. Information is often missed or documented inaccurately. Sessions are often recorded so that the hosts can replay and analyze the discussion, but this is a time-consuming process that impacts time available for other sales efforts.

One option may provide the ability to relive the experience by combining a "recording" of all aspects of the meeting including email, chat, bio responses to certain topics, etc. The problem with this option is that it requires even greater time for a sales professional to sift through the greater extent of data to qualify opportunities and make decisions or take action. Even if content is tagged throughout, someone must actively visit the suite of material and process the multiple layers of input.

Embodiments present a solution that provides greater accuracy in gauging interest of participants in the virtual meeting and greater efficiency in personalizing response(s) to participants. For example, the software application is configured to extract text related to a participant and given topic from multiple input source types within a timebox and is configured to analyze that text to derive keywords which can be used to search social media and other sources (regarding that participant and the topic) for inclusion in an analysis and summary that is provided to a specified user. Additionally, a user can utilize the software application combined with activities on her own system to provide herself with a time-capsule related to her specific interactions.

Figure 1:
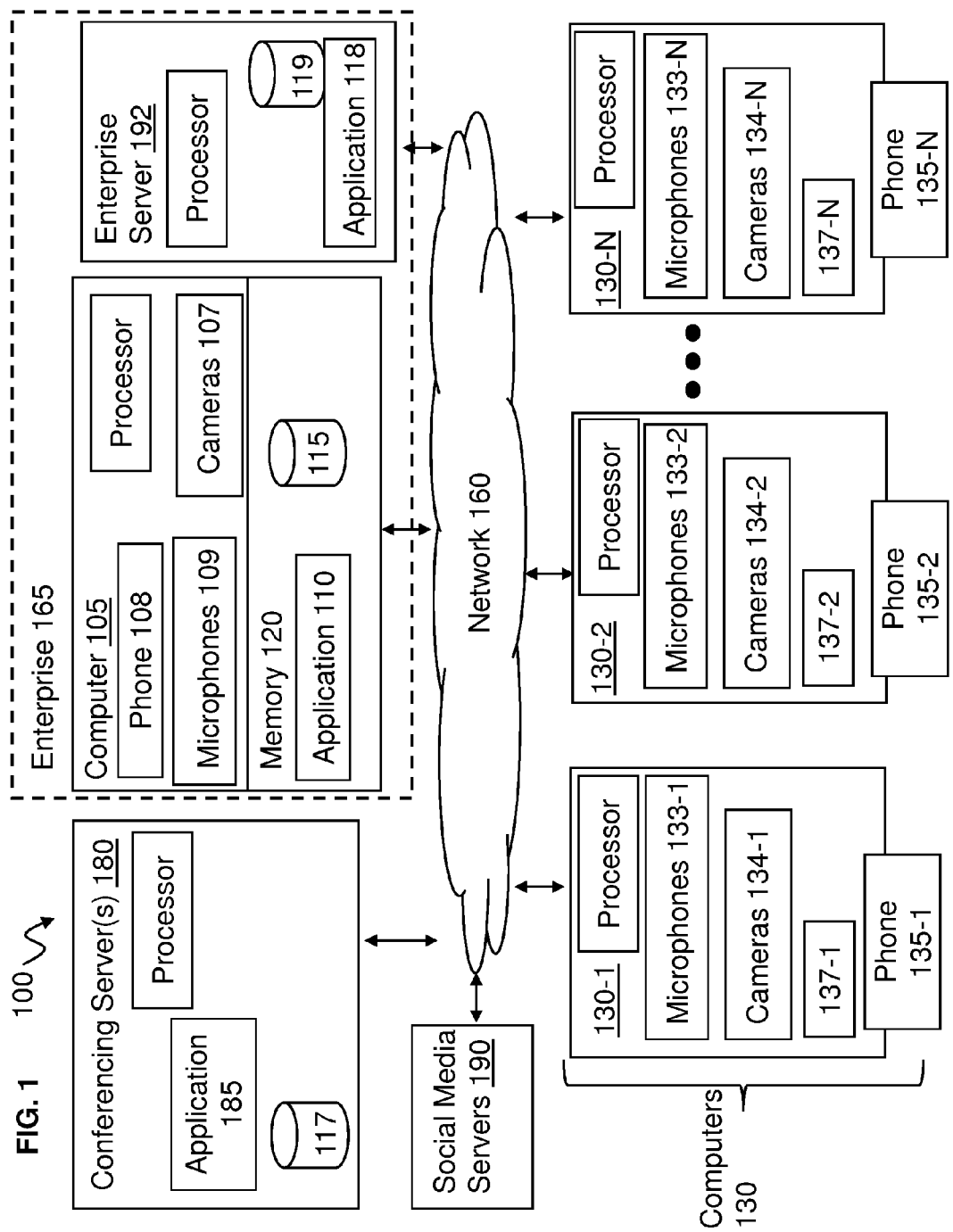
FIG. 1 illustrates a system for analysis of multiple meeting input sources with a parallel communication timebox in an electronic conference for automated qualification and response according to an embodiment.

FIG. 1 is a system 100 for analysis of multiple meeting input sources with a parallel communication timebox in an electronic conference (electronic meeting) for automated qualification and response according to an embodiment. A computer 105 is connected to one or more computers 130 via one or more network 160 during the electronic conference. The computer 105 is the host for the electronic conference in this example. The computers 105 and 130 are computing devices that represent any type of network devices transmitting and receiving communications (including audio, video, data, etc.) via the network 160. For example, the computers 130 and/or computer 105 may include devices such as smartphones, cellphones, laptops, desktops, tablet computers, and/or any type of processing device capable of making and communicating in the electronic meeting as understood by one skilled in the art.

In one case, the computers 105 and 130 may be connected to the electronic conference via one or more conferencing servers 180. The software application 185 of the conferencing server 180 is configured to facilitate the electronic conference between the computers 105 and 130. In one case, the application 185 and/or the functionality of the application 185 may be implemented/executed in the software application 110 of the host computer 105. So any electronic conferencing features (discussed herein) of the software application 185 may be included in the software application 110 as would be understood by one skilled in the art. Also, the software application 110 has full permission to all meeting input data (gathered from meeting input sources) stored and collected during the electric conference including input data stored on the conferencing server 180. To host and/or participate in the electronic conference, the computers 105 and 130 may download and install various software features from the conferencing server 180 including plug-ins, audio and video players (i.e., media players), encryption/decryption protocols, etc. The software applications for participating and/or hosting the electronic conference may include software applications 137 respectively in the computers 130 and the software application 110. The software application 137 (for the electronic conference) may be designated as software application 137-1 in computer 130-1, software application 137-2 in computer 130-2 through software application 137-N in computer 130-N. Likewise, each computer 130 may include and/or be connected to microphones 133 (respectively designated as microphones 133-1 through 133-N), video cameras 134 (cameras 134-1 through 134-N), and phones 135 (phones 135-1 through 135-N). The computer 105 may include and/or be connected to a microphone 107, phone 108, and video camera 109.

The computer 105, computers 130, server 180, server(s) 190 and servers 192 include all of the necessary hardware and software to operate as discussed herein, as understood by one skilled in the art, which includes one or more processors, memory (e.g., hard disks, solid state memory, etc.), busses, input/output devices, computer-executable instructions in software applications, databases, etc.

The following is an example scenario provided for explanation purposes (and not limitation). The software application 110 is configured to analyze all meeting input data (from meeting input sources/media input sources) and interactions from an online electronic meeting (such as, e.g., a webinar) to identify potential business opportunities and then follow-up with a personalized approach. The host computer 105 may be for a particular enterprise 165 such as IBM®, or another entity. Note that the terms electronic conference, electronic meeting, virtual meeting, etc., may be used interchangeably.

During and after the electronic conference, the software application 110 (alone and/or in conjunction with other software applications such as the application 185) is configured to perform criteria-based selection and extraction of content from multiple input source types within a timebox to be provided as a summary to a user. The user may be the user of the computer 105. The software application 110 is configured to utilize the keywords derived from a time-box of content to search social media (e.g., one or more social media servers 190 such as Facebook®, LinkedIn®, Google+®, Myspace®, etc.) and other sources (such as the (proprietary) enterprise server 192 who is hosting the electronic conference) for inclusion in an analysis and summary that is provided to the user. The software application 110 also takes into account activities on a user's local computer system to provide the host user/vendor with a time-capsule related to their specific interactions.

During the electronic conference, assume that a chat discussion with 542 attendees indicates the customer X is interested in the product features described between times 1:42 and 1:53 of a session/electronic meeting. The text statement is "That works well for us." Another customer shares a bit about their environment and verbally explains problems they are encountering. Another customer folds his arms at the mention of "enabling distributed teams."

In one situation (without the features of the software application 110), the sales team (of the vendor/host) frantically jots down notes during the meeting, reviews the chat transcript in relation to the audio recording after the meeting, reviews video to get a sense of reaction, identifies action items, etc. They must correlate responses to the context in order to understand the impact and how they should proceed.

However, in embodiments, the software application 110 is configured to automatically bring together (i.e., aggregate) information from different meeting input sources and align this information by time to identify a trigger (i.e., matched criteria) from the electronic conference. From the trigger (i.e., matched criteria), the software application 110 creates a timebox of relevant input data from all meeting input sources, and provides this information to the host user (on computer 105). The software application 110 may include (and/or operatively connect with) parsers, captioning tools, image processing tools, and others to convert sources into a text equivalent and/or text description. Accordingly, when the chat/text session indicates the customer X is interested in the product features described between times 1:42 and 1:53 of electronic conference, the software application 110 recognizes the text statement "That works well for us" as a trigger to create the timebox (e.g., the timebox 605) across all meeting input data in that timeslice; all of the input data in the timeslice is provided to the host user. Similarly, the software application 110 recognizes when another customer verbally explains problems they are encountering as a trigger to create a timebox across all meeting input data in that timeslice. Likewise, the software application 110 recognizes a trigger to create a timebox is when another customer folds his arms at the mention of "enabling distributed teams"; accordingly, a timeslice across all meeting input data from the meeting input sources is created, and provided to the host user.

Figure 2:
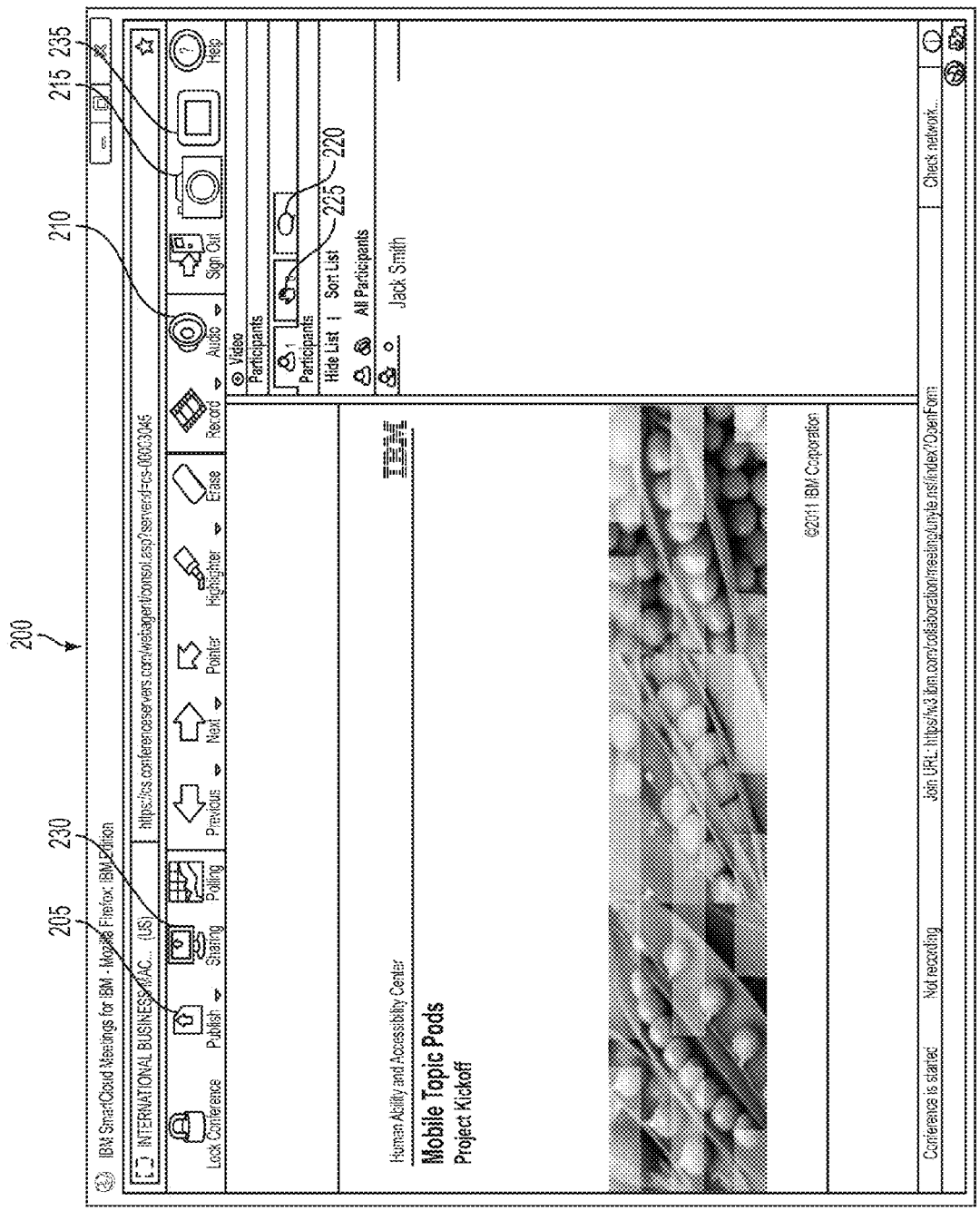
FIG. 2 illustrates a meeting tool display screen according to an embodiment.

FIG. 2 illustrates a meeting tool display screen 200 of the software application 110 according to an embodiment. The software application 110 is configured to identify meeting input sources. For example, the software application 110 may parse the display features (and/or communication socket connections) for the meeting tool display screen 200 to determine all of the meeting input sources (i.e., media input sources). In FIG. 2 various meeting input sources are identified by the software application 110 (e.g., in conjunction with the software application 185 of the conferencing server 180).

During the electronic meeting, the meeting input data of the various meeting input sources may be stored collected and/or stored in the database 115 (of the computer 105) and/or the database 117 of the conferencing server 180. Examples of the meeting input sources (also referred to as media input sources) include presentation slides 205 (meeting input source), which may be included in, connected to, and/or accessed by the software application 110. The software application 110 parses the presentation slides 205 displayed to the meeting participants along with slide notes that may not be published to the meeting participants. On upload of the file for the presentation slides 205, the software application 110 extracts the text in the slides notes and the presentation slides, along with the timestamps in of the time each presentation slide is presented to the meeting participants (of the computers 130). Image processors (e.g., included in, connected to, and/or accessed by the software application 110) are utilized to provide text description of the displayed images in the presentation slides 205.

A meeting input source includes an audio source configuration 210 (which may be linked to a 3$^{rd}$ party service) that provides audio recording, a link to the output of a transcription service, and/or real-time captioning with timestamps. The audio source configuration 210 (meeting input source) may be included in, accessed by, and/or connected to the software application 110

Another meeting input source is video recording 215 (meeting input source) and/or location of video analysis included in, connected to, and/or accessed by software application 110. In one case, the audio configuration 210 and video recording 215 may be combined. Also, chat/text capability 220 (meeting input source) may be parsed by the software application 110 (included in, accessed by, and/or connected to the software application 110) along with the respective timestamps in which the text were made. The chat/text capability 220 includes comments and questions made by the participants on the computers 130 and/or host user on the computer 105.

Meeting input sources include raising hands (and interacting) 225 by the respective participants (on computers 130), wherein raising hands 225 (meeting input source) is timestamped in real-time during the electronic conference, and this capability may be included in, connected to, and/or accessed by software application 110. A particular participant on the computer 130 may select to raise her hand, e.g., by selecting a raise hands 225 tab and typing in a question/comment that is sent to the host user at computer 105.

Another meeting input source included in, connected to, and/or accessed by software application 110 is polling activity 230 (meeting input source), which is timestamped to maintain context during the electronic conference. Polling activity 230 includes poll question along with the particular answer from the respective participants (on their computer 130). Whiteboard 235 (meeting input source) allows the host user (on computer 105) and/or a participant (on computer 130) to share his desktop screen to all during the electronic conference. It is understood by one skilled in the art that there may be additional types of meeting input sources, and these meeting input sources may be included in, connected to, and/or accessed by software application 110.

For some meeting input sources, the software application 110 (and/or the software application 185) is configured to convert these meeting input sources into timestamped text in real-time. Other meeting input sources are captured/recorded throughout the electronic meeting and stored (e.g., in the databases 115 and 117) for subsequent analysis (e.g., as video analysis, audio analysis, text/chat analysis, etc.) by the software application 110 (and/or the software application 185).

Figure 3:
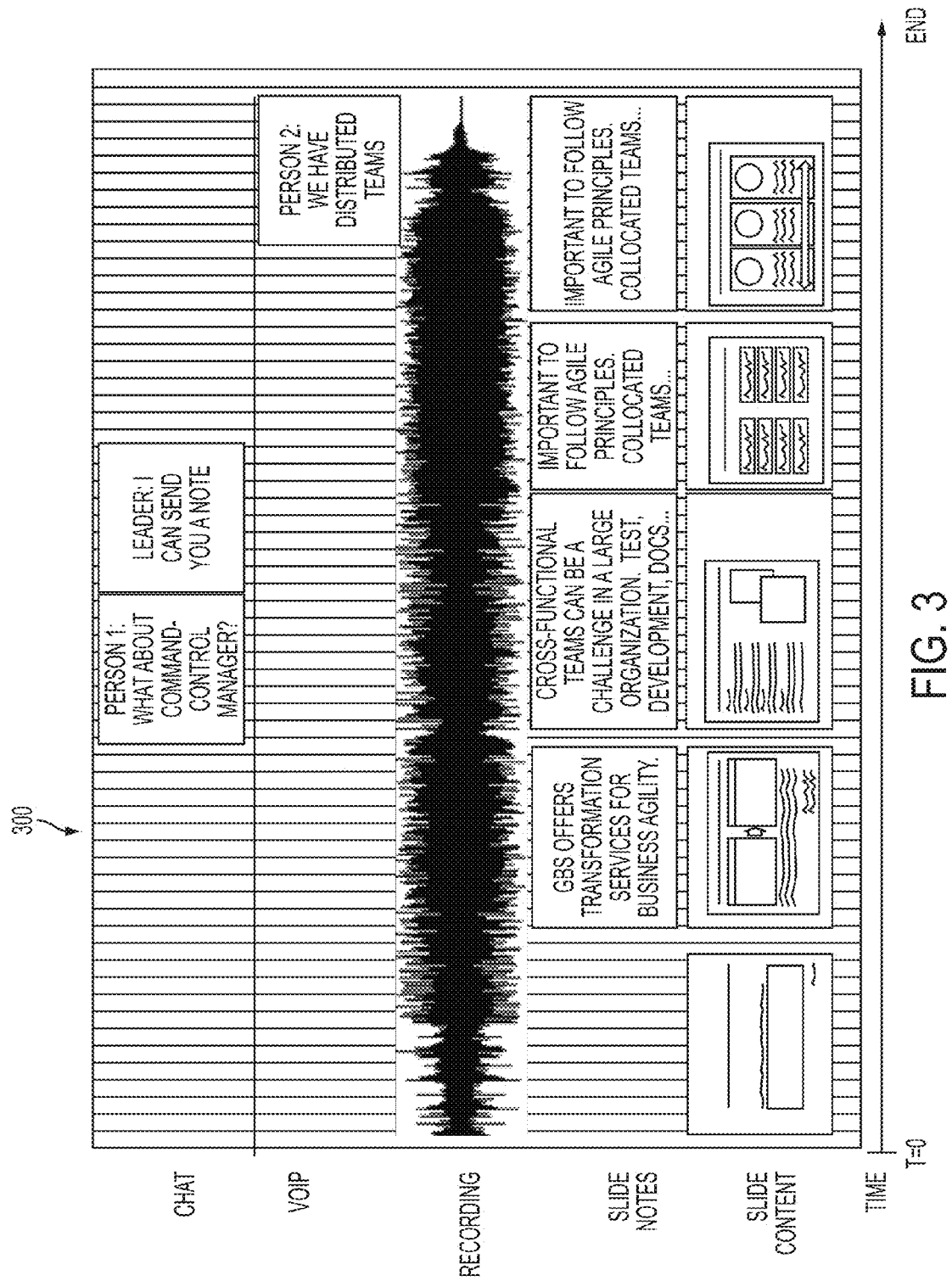
FIG. 3 illustrates aligning the input data from the various meeting input sources in a timeline alignment according to an embodiment.

In timeline alignment 300, FIG. 3 illustrates how the software application 110 aligns input data from the various meeting input sources according to an embodiment. For the sake of brevity, all meeting input sources are not shown in FIG. 3 although the software application 110 aligns the input data from all meeting input sources for analysis and processing as discussed herein.

Data for each meeting input source is collected and laid out along a timeline by the software application 110. For example, the software application 110 is configured to align all the data from potentially different meeting input sources by timestamps. The timeline starts at time T=0 for the beginning of the electronic conference (i.e., virtual meeting).

Some data (from the meeting input sources) will have already been converted to text and/or analyzed in real-time (by the software application 110). Parsers of the software application 110 can easily determine (and align on the timeline) the duration (i.e., beginning and ending) of time that a presentation slide was displayed (and the speaker notes that apply), time in which chat text were typed/sent, time during audio recording (e.g., VOIP), time during general recording (e.g., video, audio, and both audio and video), time a desktop was shared on the whiteboard, time a polling question was responded to, time an attitude from video shows a positive emotion and/or negative emotion, etc.

The software application 110 is configured to align all data (captured from the meeting input sources) from the beginning of the electronic conference through the end of the electronic conference.

FIG. 4 illustrates the timeline alignment 300 in which the input data of each meeting source is converted (by the software application 110) to text equivalents and/or text descriptions (if the input data is not originally text) with timestamps retained according to an embodiment. Using the timestamps, the software application 110 aligns slide presentation content displayed (e.g., from one meeting input source) with a chat/text session (e.g., from a second meeting input source), and a recording (e.g., from a third meeting input source), etc. The software application 110 is configured to convert the recording data, slide content data, and the VOIP data (along with attitude/mood data from video) into text equivalent and/or text descriptions (e.g., via image processors and speech to text conversions), and performs analysis on all data. In one case, the software application 110 may interact with existing software applications in the art to perform conversions and/or provide analysis. At this point, all data (information) is aligned by time via the software application 110.

The software application 110 is configured to establish the beginning and end boundaries of what is considered as "matched content" across a timeslice (by criteria (i.e., triggers) role, amount of time before/after match) in the timeline alignment 300. The timeslice is a portion taken from the meeting input data in the timeline alignment 300 across a slice of time, and the timeslice is presented in the timebox 605 shown in FIG. 6.

The software application 110 is configured to identify keywords from across the timeslice of different data meeting sources (i.e., in the timebox 605) by parsing the specific data in the timeslice (including a predefined amount of time before and after the matched criteria which can be utilized to set the timebox 605 boundaries in FIG. 6). Once keywords are determined, the software application 110 is configured to utilize these keywords to search other repositories in the various social media servers 190 and the enterprise server 192 for packaging of data related to the timeslice; the software application 110 retrieves the searched for keyword data from the social media servers 190 and the enterprise server 192. The software application 110 is configured to create an organized package (e.g., the organized package 700 shown in FIG. 7) of the input data (in timebox 605) from each of the (i.e., across) multiple input sources that occurred during the timeslice (of the timeline alignment 300) along with the retrieved keyword data (i.e., keyword search results 705 shown in FIG. 7) from the keyword search of social media servers 190 and the enterprise server 192.

Now, the various criteria utilized as triggers to create the timebox are further discussed. The criteria may be input by the host user of computer 105 before, during, and/or after the electronic conference. The user (of computer 105) chooses the information he is interested in, and this criteria is utilized to create the organized package. The organized package may be designated as a data time capsule because the information in the organized package is based on a timeslice of the electronic meeting which occurs within a timebox that has its start and end time triggered by the set criteria.

FIG. 5 illustrates a display box 500 (of the software application 110) in which the user of the computer 105 can input criteria for triggering the start/creation of an example timebox 605 (when the criteria matches the input data from the meeting input sources) according to an embodiment. Note that the example timebox 605 is shown in FIG. 6. As an example of criteria input by the user, the display box 500 shows that the user can select any of the following (which causes the software application 110 to search through all meeting input data from the meeting input sources for the identified criteria).

1) Interactions by person/participant [e.g., indicate person]. For example, when each participant (individually utilizing her respective computer 130) logs into the electronic conference via software application 137, the participant enters her name, business/enterprise name (i.e., company name), role/position in the company, customer, username, password, etc. The host user of software application 110 can select a particular participant (e.g., Bob Smith) who may be the purchase coordinator of the company X. Accordingly, when Bob Smith interacts (in any of the meeting input sources) during the electronic conference, the software application 110 recognizes Bob's interaction and identifies the start (and end) for the timebox. The interactions may include voice (speaking by Bob), text by Bob, raising hand for a question by Bob, an answer to a polling question by Bob, a positive attitude/emotion by Bob as determined by video analysis of video footage recorded from Bob's video camera, a negative attitude/emotion as determined by video analysis, and anything done by Bob via his computer 130 (e.g., Bob may be utilizing computer 130-2 which is identified by the software application 110 when Bob logs into the electronic conference).

2) Interactions by role [e.g., indicate role]. For interaction by role, the user can identify a role such as CEO, purchase coordinator (i.e., Bob Smith), vendor, customer, etc., that the software application 110 utilizes as trigger to create the timebox 605 around. In one case, the user of computer 130 can select the role to be the trigger once all participants (respectively on computers 130) have identified themselves. For example, the software application 110 is configured to determine any interaction in the electronic conference by the CEO (when the CEO is designated as criteria), and when the interaction (e.g., any interaction discussed herein) by the CEO is determined, the software application 110 creates the timebox 605 discussed herein.

3) Attitude [e.g., indicate to select those interested and/or those not interested]. Via the video cameras 134, the software application 110 (alone and/or in conjunction with existing emotion/mood recognition software understood by one skilled in the art) recognizes the emotion/mood of participants that are interested and/or uninterested. The host user on computer 105 can select for interested participants to be identified by the software application 110, and when identified, the software application 110 creates a timebox across the various meeting input sources.

4) Interactions related to topic. The software application 110 (e.g., implemented and/or operatively connected to speech to text software) determines when a participant makes a text and/or voice comment that matches a word or phrase. Analytical/semantics software of the software application 110 (and/or existing analytical/semantics software understood by one skilled in the art) analyzes the text and/or voice to determine when a participant utters the word or phrase. The software application 110 may be configured to create a timebox on detection of specific words and/or phrases. For example, participant may say verbally and/or in text "Rational Team Concert" or "RTC." When determined, the software application 110 creates a timebox across the various meeting input sources related to "Rational Team Concert" or "RTC."

5) Customers who provided comments. There may be some participants on computers 130 who are customers (e.g., input customer (or an equivalent term) when they logged in). The software application 110 recognizes all customers, and creates a timebox 605 whenever any customer participant on computers 130 makes a text and/or voice comment (via speech to text software) including raising hands during the electronic conference. When identified, the software application 110 creates a timebox across the various meeting input sources 6) Commitments to take action. The software application 110 (e.g., implemented or operatively connected to speech to text software) determines when a participant makes a text and/or voice comment that is a commitment to take action. Analytical/semantics software of the software application 110 (and/or existing analytical/semantics software understood by one skilled in the art) analyzes the text and/or voice to determine when a participant makes a positive comment to take action. For example, a participant may say verbally and/or in text "I want that product", "that is a great feature that we need to buy", "I want an order of XYX product", "Put that feature in my next order", "we need a follow-up meeting about this feature", etc. When determined, the software application 110 creates a timebox across the various meeting input sources These are some example criteria that the user may input/select to start the timebox 605. It is understood that other criteria may be utilized according to embodiments disclosed herein. Other criteria may include but are not limited to detecting when pulse races (i.e., heart). Video analysis software (e.g., included in and/or in cooperation with the software application 110) detects slight changes in video and magnifies them. This allows the software application 110 to detect if someone's pulse is racing.

Additional criteria may be if the software application 110 determines that a large number of people drop off the call and/or electronic conference early, the software application 110 is configured to created and send a timebox of the last N minutes before they dropped off.

Another criteria detected by the software application 110 may be if a threshold of activity that defines "rapid exchange" is achieved, the software application 110 is configured to created and send the timebox from the start of the rapid activity to the end.

FIG. 5 also illustrates a display box 505 in which the user (on computer 105) indicates that he wants additional searches of repositories related to any keywords discovered in the timebox 605 by the software application 110. For example, keywords are found by the software application 110 from searching through all of the meeting input data of the meeting input sources during the start time and ending time of the timebox 605. Using the keywords determined during the electronic conference within the timebox 605, the software application 110 is configured to search the various social media servers 190, and the enterprise servers 192 of the host user (on computer 105). For example, the software application 110 may interface with a server application 118 (e.g., API) to query a customer support database 119 of the enterprise server 192. The software application 110 may retrieve that the participant (e.g., customer) has placed several orders for a product A, has had several complaints about a product Y, has no complaints about a product Z, has previously requested additional information about product YY but no one responded, etc. All of this is excellent information that can be utilized when following up with the participant (i.e., customer). Accordingly, the search results (i.e., search results 705) from both the social media servers 190 and the enterprise servers 192 are included in the organized package 700 for the host user on computer 105.

FIG. 6 illustrates an example of how the software application 110 searches all of the meeting data from the meeting input sources to identify a match (i.e., matched content) to the criteria (for the trigger) for creating the timebox 605 according to an embodiment. Based on the search criteria selected by the host user (on computer 105), the software application 110 identifies a capsule or timebox match. Different rules can be used to set the timebox 605 of information that gets retrieved. For example, the software application 110 can search by who is speaking and what is displayed while that person is speaking. The software application 110 can search on chat/text exchanges (e.g., between participants, the host, and/or the speaker). The software application 110 can search where someone uses a negative word in chat/text, where someone uses a negative word in voice, by participant registration data (name, role, address, area code, etc.), through video data that has been analyzed (posture, attitude, pulse, etc.), by frequency of activity across the input types, by raising a hand in the tool, by sensor data, by slide data, etc.

At this point, assume that person 1's interaction (i.e., a particular participant on her respective computer 130) is a match to the criteria searched for by the software application 110, and the match causes the software application 110 to create the timebox 605. This match of the interaction (by the software application 110) could be voice (such as person 1 speaking, person 1's positive statement, person 1's negative statement, person 1's commitment to action, etc.), video (such as person 1's positive attitude (i.e., positive emotion), person 1's negative attitude (i.e., negative emotion), etc.), text/chat (such as person 1 making any text statement, person 1 making a positive text statement, person 1 making a negative text statement, etc.), raising hand (such as person 1 electronically raising hand to ask a question), polling (such as a positive and/or negative response made by person 1 to a polling question), showing desktop (such as person 1 choosing to show her desktop during the electronic conference), markups on whiteboard (such as person 1 making an annotation, change, or correction on the whiteboard), and/or any other matching criteria discussed herein.

Further, the software application 110 can create the timebox 605 based on sentiments (as determined from voice, text/data chat, raising hand, etc., in the meeting input sources). The identified sentiment (as determined and retrieved by the software application 110) can serve as part of the search criteria utilized to provide summaries to event managers (e.g., the host user on the computer 105). Examples of sentiment that the software application 110 searches for and utilizes to create the timebox 605 (when found) may include the following: "I really like . . . ", "That didn't work . . . ", "I don't understand . . . ", "Why does/doesn't it . . . ", "We prefer . . . ", "Does it also . . . ", " . . . didn't work for us . . . ", " . . . have trouble with . . . ", and so forth.

Once the timebox 605 has been created, the software application 110 is configured to provide a summary (i.e., data capsule, data time capsule, time capsule) of person 1's interaction and the context (within the electronic conference) to the host user on computer 130 (and/or to any other participant that has set up criteria as discussed herein), and an example of this summary is the organized package 700. Based on the meeting input data collected by the software application 110 (only) within the timebox 605, the capsule sent or provided to the host user on computer 105 might include: chat exchange, what the presenter was saying at the time (i.e., the text equivalent along with the voice and video recording), what the slide notes indicated the presenter should say, slide content displayed during that time, the comment made when the person 1 raised his hand, the positive or negative emotion of the person 1, etc.

Further, the software application 110 is configured to analyze the text and text equivalents (e.g., from voice, presentation slides (via image processor), etc.) in the timebox 605 to identify and retrieve keywords (i.e., important words). The software application 110 uses these identified keywords to search other sources, such as the social networking/media servers 190 (which represent various individual social networking websites/servers) and the enterprise server 192. For example, the host user (on computer 105) can configure the software application 110 (e.g., to work in conjunction with the server application 118) to perform lookups of customer interactions (e.g., in this case person 1's interactions who may be a customer or CEO) with the enterprise 165 in the database 119. In a case, where a customer (i.e., a participant on computer 130, like person 1) chatted about a particular product, the software application 110 is configured to look up additional information about that customer as related to that product in customer support databases (like database 119), social network communities, etc.

As taken from the timebox 605, an example of the keyword search extracted by the software application 110 to obtain more information may be the following search string: Agile+cross-functional teams+large organizations+command and control+Person_1_name. The plus sign (+) represents "and" operator.

Figure 7:
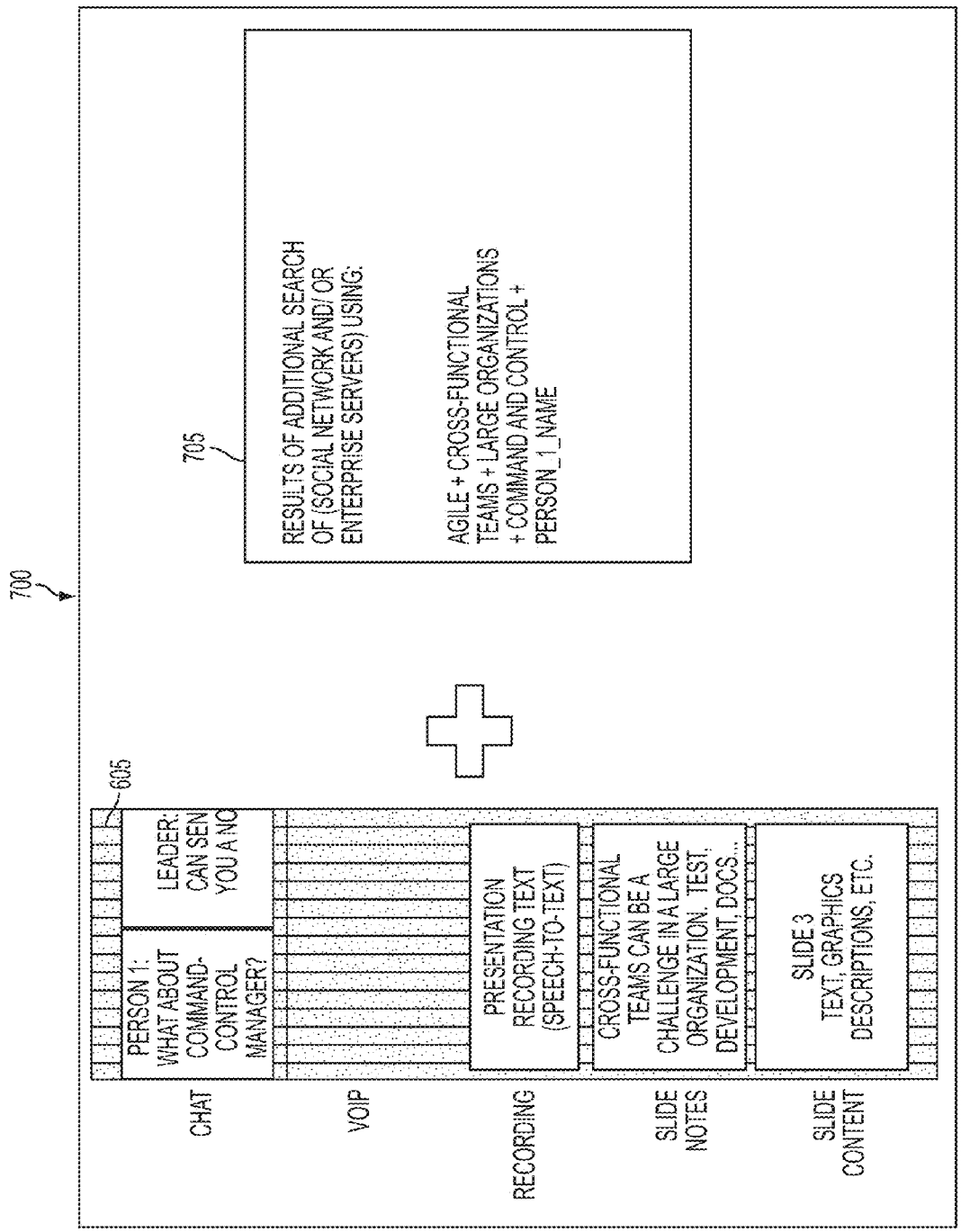
FIG. 7 illustrates creation of an organized package (i.e., data time capsule) that is sent and/or provided to the host user according to an embodiment.

FIG. 7 illustrates creation of the organized package 700 (i.e., data time capsule) that is sent and/or provided to the host user on the computer 105 via the software application 110 according to an embodiment. The organized package 700 includes the timeslice of data in the timebox 605 taken from the various meeting input sources and the keyword search results 705 of the additional search (performed against various websites and databases, such as social network websites respectively hosted on social media servers 190 and support customer databases on the enterprise server 192).

The software application 110 is configured to execute appropriate action based on packaging the timebox data in the timebox 605 and searched data of the search results 705 (i.e., data retrieved from the keyword search). The appropriate action to provide the organized package 700 may include sending emails (to designated people, such as the host user), displaying the organized package 700 on the display screen, sending out notes that the organized package 700 is available (along with a link to the organized package 700), and/or any other means to distribute the organized package 700.

As an email (display on a display screen) example, the following may be sent to the host user of computer 105, event managers, and/or any other designated person:

```
**************************************************
BobSmith@enterprise.com:
Focus areas: Large-scale organizations
Biometric Reaction: Negative
Search Results Summary:
    20 Hits on agile and large-scale on jazz.net and
    Developerworks.com
Details:
    Links to search results
    Links to timesliced data
**************************************************
```

Additional actions by the software application 110 may be auto-responses that have been set, e.g., by the host user on computer 105. One auto-response may be for the software application 110 to send the summary (i.e., organized package 700) to a sales consultant with recommendation of follow-up. Another auto-response by the software application 110 is to send a "Thank you" to the participant that triggered the timebox 605 creation (such as person 1) with a link to a free "Value to Agile in a Large-scale organization course" that is run/sponsored by the enterprise (e.g., on the enterprise server 192).

Now, turning to FIG. 8, a flow diagram 800 illustrates the electronic conference and processing by the software application 110 according to an embodiment.

It may be assumed that the speaker for the presentation is utilizing the host user's computer 105, the host user is the speaker, and/or the speaker is utilizing a computer 130. The slide presentation is uploaded to the computer 130 (via the software application 110) and/or to the conferencing server 180 (where the software application 110 has complete access to the slide presentation including slide notes) at block 802. The software application 110 is configured to extract content from the uploaded slide presentation at block 804. For the electronic conference, the conferencing server 180 (or the software application 110) may initiate related activities of the meeting input sources, such as VOIP, video, audio, audio and video, telephone bridge, etc., and the virtual meeting begins at block 806.

At block 808, the software application 110 (e.g., in cooperation with the software application 185) is configured to capture all related activities of the meeting input sources and then timestamp these activities which includes timestamping the clicking through the slide presentations, translations, speech to text/chat, raising hands, video, audio, etc. The software application 110 may execute conversions in real-time, and the conversions include image processing that determines a text equivalent or text description of the images on the slide presentation, facial and mood recognition of the video that determines the sentiment (i.e., mood and attitude) of the participants, speech to text conversion of the audio portion (of the speaker and participants), etc.

The virtual meeting of the electronic conference ends. At block 810, the software application 110 completes processing which includes conversions and timestamps for input data of the various meeting input sources. At block 812, the software application 110 synchronizes conversions from the multiple meeting input sources to text, and the software application 110 timestamps all converted data for correlation. The software application 110 creates the timeline alignment 300 chart across all of the meeting input sources as shown in FIG. 4, which now includes a text version (including data that does not need to be converted to text such as text/chat, slide notes, etc.) of all input data from the multiple meeting input sources at block 814. Note that the files (with meeting input data) corresponding to all of the meeting input sources can be stored (by the software application 110) in the database 115 and/or 117, for later matching to create the timebox 605.

Figure 9:
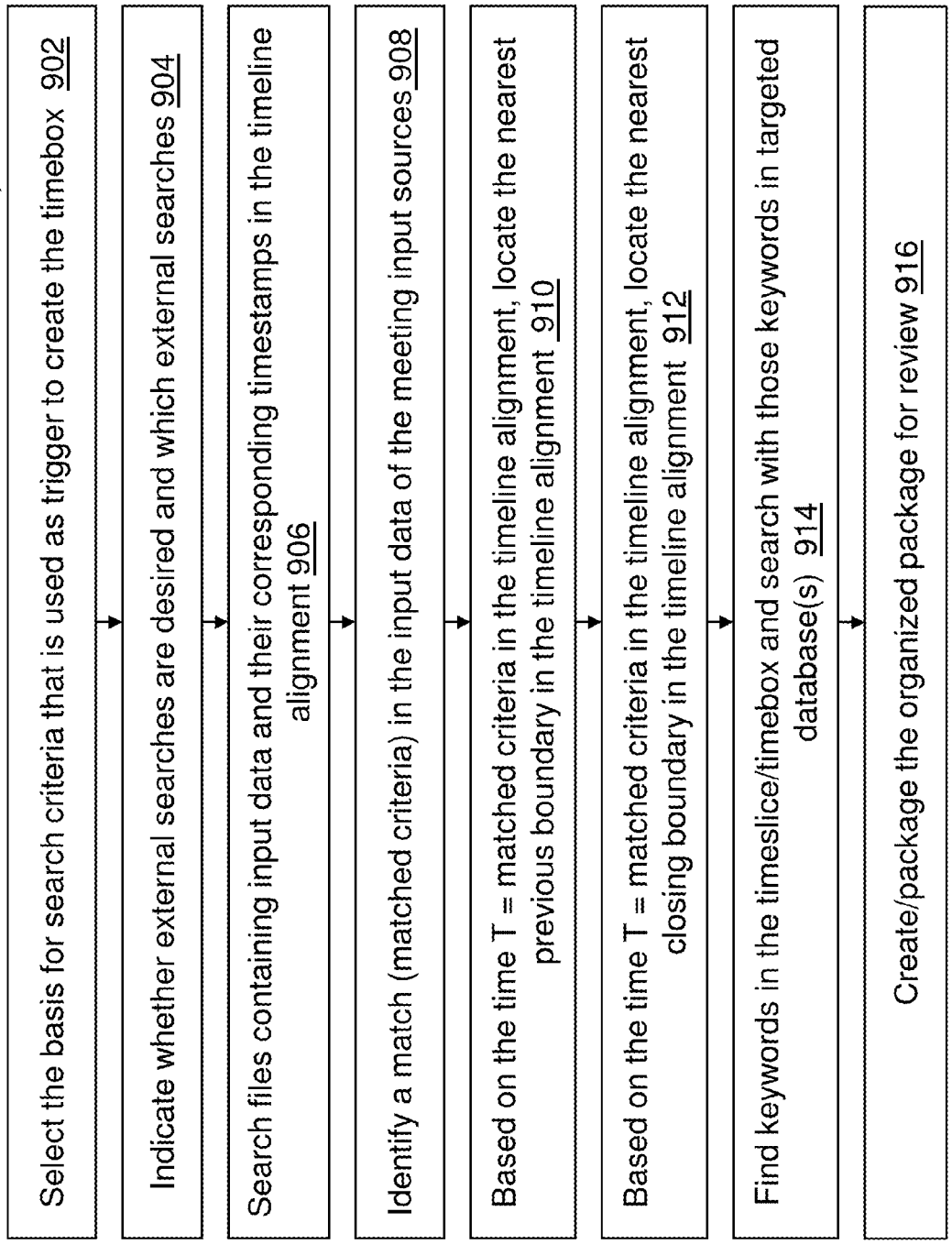
FIG. 9 illustrates a flow diagram for selecting search criteria (i.e., match criteria) to create the timebox and for creating the organized package according to an embodiment.

FIG. 9 illustrates a flow diagram 900 for selecting search criteria (i.e., match criteria) to create the timebox 605 and creating the organized package 705 according to an embodiment.

The user selects the basis for search criteria that is used as the trigger to create the timebox 605 at block 902. For example, the host user may select to find potential leads (utilizing any of the techniques discussed herein, such as role, sentiment (i.e., positive attitude), text/chat, raising hands, etc.) and/or find interest in product Y.

The host user indicates to the software application 110 whether or not external searches are desired and which external searches at block 904. For example, the host user may designate external searches on the social media servers 190 and the enterprise server 192, e.g., in the display box 505.

Via the input search criteria in the display box 500, the software application 110 searches files containing input data (e.g., stored in database 115 and/or 117 from the electronic conference) and their corresponding timestamps in the timeline alignment 300 at block 906, and the software application 110 identifies a match (i.e., matched criteria) in the input data of the meeting input sources at block 908. With reference to FIG. 6, the matched criteria may be found at time T=matched criteria.

Based on the time T=matched criteria in the timeline alignment 300, the software application 110 locates the nearest previous boundary in the timeline alignment 300 (before the time T=matched criteria) at block 910. The nearest previous boundary (i.e., prior to the matched criteria time) can be set in the software application 110 to be determined as the start of the present slide (concurrently displayed) corresponding to when T=matched criteria, determined as K amount of time prior to the time T=matched criteria (such as 1, 2, 3, 4, 5 . . . 10 minutes before or more), determined as the change from the previous speaker (before the current speaker in which the time T=matched criteria), and so forth.

Based on the time T=matched criteria in the timeline alignment 300, the software application 110 locates the nearest closing boundary in the timeline alignment 300 (after time T=matched criteria) at block 912. The nearest closing boundary (i.e., after the matched criteria time) can be set in the software application 110 to be determined as the slide transition (i.e., the transition from the present slide (concurrently displayed and corresponding to when T=matched criteria) to the next slide), determined as K amount of time after the time T=matched criteria (such as 1, 2, 3, 4, 5 . . . 10 minutes after or more), determined as a change in speaker (e.g., the change from the current speaker in which the time T=matched criteria to the next speaker), and so forth.

Note that, in blocks 910 and 912, the software application 110 establishes the beginning and end boundaries of what is considered as "matched content" across a timeslice/timebox 605 (by role, amount of time before/after match, etc.).

At block 914, the software application 110 determines and extracts keywords in the timeslice/timebox 605, and searches with those keywords in targeted database(s) to find further business information regarding the person (such as person 1 who caused the trigger by verbal statements, emotion/attitude (determined by facial and mood recognition software integrated with the software application 110), text/chat statements, raising hand, response to polling question, etc.) including interactions with customer support, social activities, etc. As noted herein, when the software application 110 identifies the keywords from within the timebox 605 cutting across different meeting input sources, those keywords can be utilized to search other repositories for packaging of data.

At block 916, the software application 110 creates/packages organized package 700 and sends to host user and/or creates the organized package 700 for later review. The organized package 700 is a context package of the information across the multiple input sources that occurred during the timeslice/timebox 605, along with keyword search results 705 from other databases. As related to the person 1 and the subject mater (within the timebox 605), the keyword search results 705 may include links, research papers, magazine articles, complaints, interests, information found on social sites of social media servers 190, etc. Further, in the keyword search results 705 (for participant 1) via the social media servers 190, LinkedIn® may provide job history, interests, groups, current role, professional network composition, Facebook™ may provide the likes and personal interests (of participant 1), a customer database might describe aspects of the customer's business/company or purchases made by the customer (e.g., participant 1), a support database might identify products that the person (e.g., participant 1) has had challenges with, a search of listserv lists or online groups may extract comments made by the individual (e.g., participant 1) on similar topics, etc.

The software application 110 may also creates an index to sections (e.g., listing the matched criteria, the corresponding slide presently displayed when the criteria was matched and/or the slide previously displayed before the criteria was matched, the corresponding text/chat, the slides notes to the presently displayed slide and previously displayed slide, the results of the searched for keywords) in completed work of the organized package 700 so that the host user can easily maneuverer through the organized package.

Figure 10:
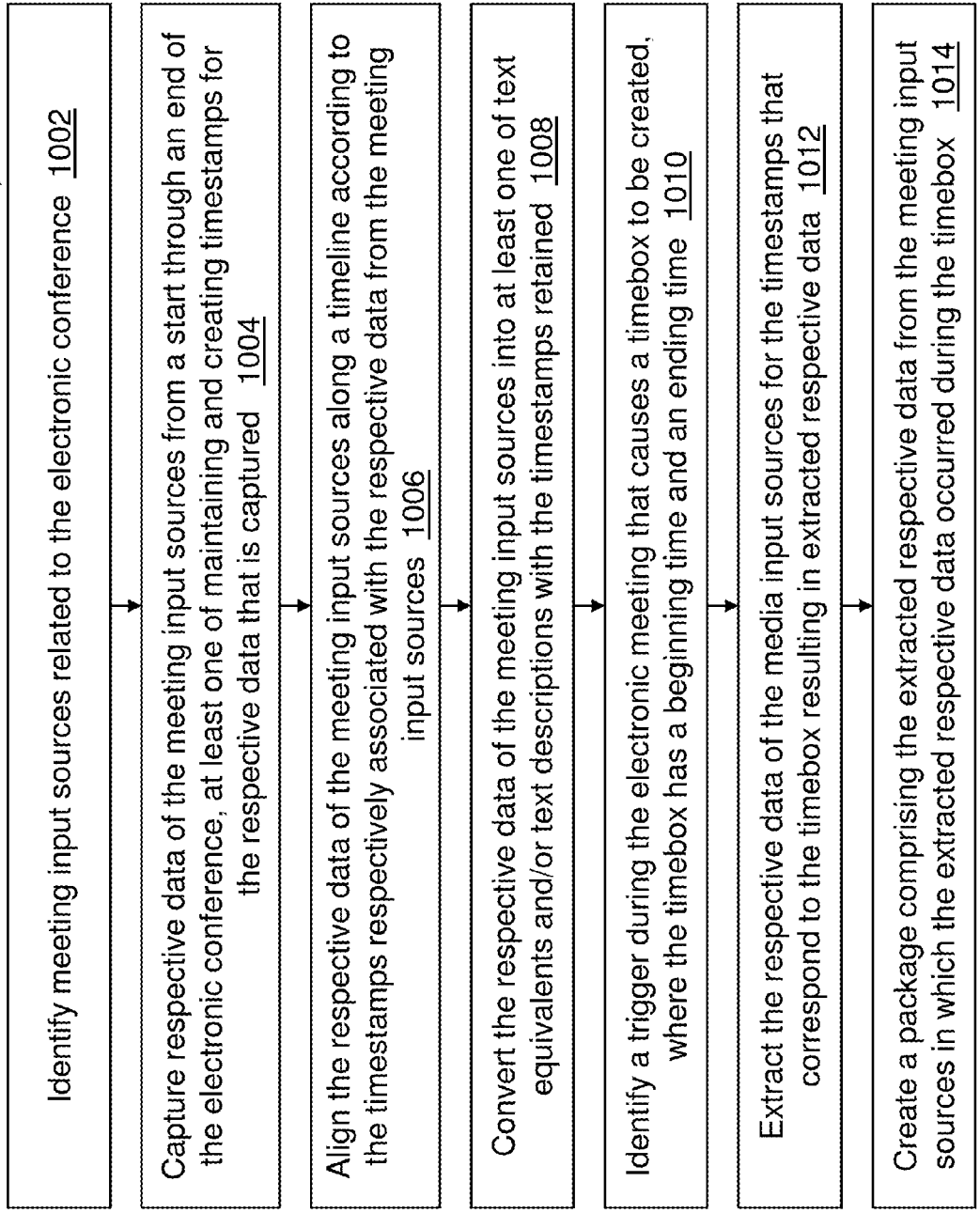
FIG. 10 is a flow chart of a method for providing a time data capsule (i.e., organized package) for a designated time period in an electronic conference according to an embodiment.

FIG. 10 is a flow chart of a method 1000 (by the software application 110) for providing a time data capsule (i.e., organized package 700) for a designated time period in an electronic conference according to an embodiment.

The software application 110 is configured to identify meeting input sources related to the electronic conference at block 1002.

At block 1004, the software application 110 is configured to capture respective data of the meeting input sources (i.e., each meeting input source has its own individual data) from a start through an end of the electronic conference, while at least one of maintaining and/or creating timestamps for the respective data that is captured. Each piece of the respective data has its own corresponding timestamps.

At block 1006, the software application 110 is configured to align the respective data of the meeting input sources along a timeline according to the timestamps respectively associated with the respective data from the meeting input sources as shown in FIGS. 3, 4, and 6.

The software application 110 is configured to convert the respective data of the meeting input sources into at least one of text equivalents and/or text descriptions with the timestamps retained at block 1008.

The software application 110 is configured to identify a trigger during the electronic meeting that causes a timebox 605 to be created, where the timebox 605 has a beginning time and an ending time (i.e., beginning/start boundary and end boundary) at block 1010.

The software application 110 is configured to extract the respective data of the meeting input sources for the timestamps that correspond to the timebox 605 resulting in extracted respective data at block 1012. At block 1014, the software application 110 is configured to create the organized package 700 includes the extracted respective data (i.e., the extracted data from the timebox 605 in FIG. 7) from the meeting input sources in which the extracted respective data occurred during the timebox 605 initiated by the trigger.

The method includes the software application 110 parsing the extracted respective data in the timebox 605 to determine keywords for searching. The method includes the software application 110 searching the social media servers 190 with the keywords determined in the timebox 605, and searching enterprise servers 192 with the keywords determined in the timebox 605. The enterprise servers 192 correspond to the host user (computer 105) of the electronic conference, and the keywords are utilized to search customer support databases and product ordering databases of the enterprise servers 192. The method includes the software application 110 adding search results 705 of the keywords, extracted from the timebox 605, to the organized package 700 along with the extracted respective data.

When the respective data of the meeting input sources is aligned according to the timestamps along the timeline, the timebox 605 is a timeslice across the respective data and bound on the timeline by the beginning time and the ending time (in the timeline alignment 300 in FIGS. 3, 4, and 6). The software application 110 is configured to exclude any of the respective data not contained within the timebox 605 to identify the extracted respective data.

The respective data is input data that individually originates from different ones on the meeting input sources related to the electronic conference. The meeting input sources for the electronic conference include at least one of a voice input source, a video input source, a text or chat input source, a raising hand input source, a response to polling question input source, a slide presentation input source, a whiteboard input source, and/or a show desktop input source.

Technical benefits include providing a brief capsule of information across media types or content aspects of a virtual meeting, and increasing productivity by allowing users to focus on just the smaller slices of a meeting that are most relevant. Embodiments can take input from a variety of sources, tagged with timings, in order to provide a capsule of context for the event coordinator or provide a way to integrate third party data sources for additional info (such as Linkedin®, social databases, enterprise databases, etc.). Embodiments can be utilized to derive contextual implications of user (participant) reactions for a specific purpose (e.g., sales, quality control, process improvement, and customer satisfaction/interaction). Embodiments provide improved reaction to sales leads, increased productivity by requiring less work, and increased functionality for other sales related software.

Figure 11:
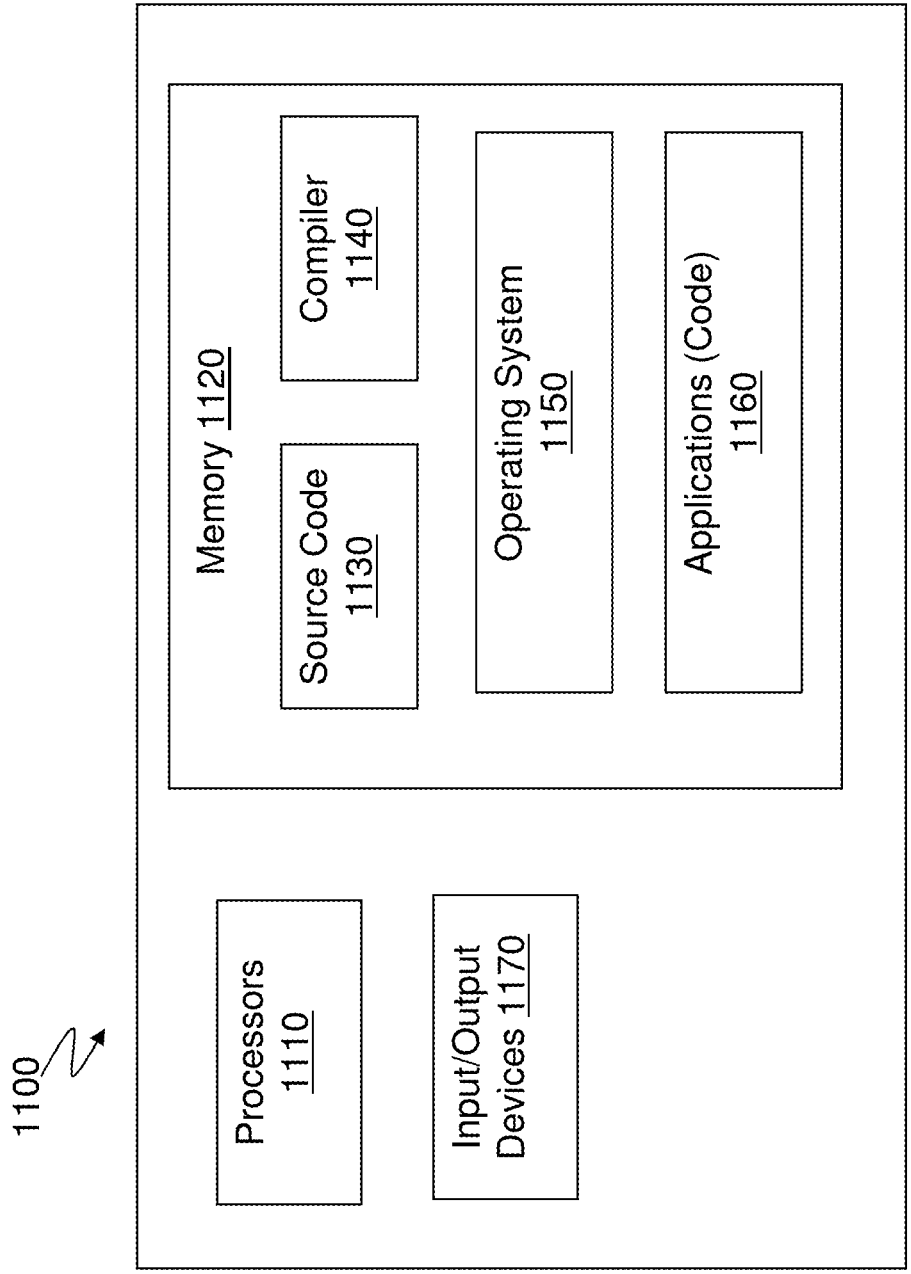
FIG. 11 is a block diagram that illustrates an example of a computer (computer setup) having capabilities, which may be included in and/or combined with embodiments.

Now turning to FIG. 11, an example illustrates a computer 1100 (e.g., any type of computer system discussed herein including computers and servers 105, 130, 190, 180 and 192) that may implement features discussed herein. The computer 1100 may be a distributed computer system over more than one computer. Various methods, procedures, modules, flow diagrams, tools, applications, circuits, elements, and techniques discussed herein may also incorporate and/or utilize the capabilities of the computer 1100. Indeed, capabilities of the computer 1100 may be utilized to implement features of exemplary embodiments discussed herein.

Generally, in terms of hardware architecture, the computer 1100 may include one or more processors 1110, computer readable storage memory 1120, and one or more input and/or output (I/O) devices 1170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1110 is a hardware device for executing software that can be stored in the memory 1120. The processor 1110 can be virtually any custom made or commercially available processor, a central processing unit (CPU), a data signal processor (DSP), or an auxiliary processor among several processors associated with the computer 1100, and the processor 1110 may be a semiconductor based microprocessor (in the form of a microchip) or a macroprocessor.

The computer readable memory 1120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1120 may incorporate electronic, magnetic, optical, and/or other types of storage media. Note that the memory 1120 can have a distributed architecture, where various components are situated remote from one another, but can be accessed by the processor(s) 1110.

The software in the computer readable memory 1120 may include one or more separate programs, each of which comprises an ordered listing of executable instructions for implementing logical functions. The software in the memory 1120 includes a suitable operating system (O/S) 1150, compiler 1140, source code 1130, and one or more applications 1160 of the exemplary embodiments. As illustrated, the application 1160 comprises numerous functional components for implementing the features, processes, methods, functions, and operations of the exemplary embodiments.

The operating system 1150 may control the execution of other computer programs, and provides scheduling, input-output control, file and data management, memory management, and communication control and related services.

The application 1160 may be a source program, executable program (object code), script, or any other entity comprising a set of instructions to be performed. When a source program, then the program is usually translated via a compiler (such as the compiler 1140), assembler, interpreter, or the like, which may or may not be included within the memory 1120, so as to operate properly in connection with the O/S 1150. Furthermore, the application 1160 can be written as (a) an object oriented programming language, which has classes of data and methods, or (b) a procedure programming language, which has routines, subroutines, and/or functions.

The I/O devices 1170 may include input devices (or peripherals) such as, for example but not limited to, a mouse, keyboard, scanner, microphone, camera, etc. Furthermore, the I/O devices 1170 may also include output devices (or peripherals), for example but not limited to, a printer, display, etc. Finally, the I/O devices 1170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1170 also include components for communicating over various networks, such as the Internet or an intranet. The I/O devices 1170 may be connected to and/or communicate with the processor 1110 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 1160 is implemented in hardware, the application 1160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of providing a time data capsule for a designated time period in an electronic conference, comprising:

identifying meeting input sources related to the electronic conference, wherein the meeting input sources for the electronic conference comprise a raising hand input source, a response to polling question input source, a slide presentation input source, and a show desktop input source;

capturing respective data of the meeting input sources from a start through an end of the electronic conference, at least one of maintaining and creating timestamps for the respective data that is captured, the timestamps associated with the respective data;

aligning by a computer the respective data of the meeting input sources along a timeline according to the timestamps respectively associated with the respective data from the meeting input sources;

converting the respective data of the meeting input sources into at least one of text equivalents and text descriptions with the timestamps retained;

identifying a trigger during the electronic conference that causes a timebox to be created, the timebox having a beginning time and an ending time;

wherein criteria for the trigger is set in advance; and wherein options of the criteria for the trigger comprise a positive emotion of a given participant, a negative emotion of the given participant, a problem verbally indicated by the given participant during the electronic conference, an interaction during the electronic conference by a person having a pre-identified role or name, and a positive commitment indicated during the electronic conference to take action by the given participant for a product order;

extracting the respective data of the meeting input sources for the timestamps that correspond to the timebox resulting in extracted respective data; and creating a package comprising the extracted respective data from the meeting input sources in which the extracted respective data occurred during the timebox initiated by the trigger.

2. The method of claim 1, further comprising parsing the extracted respective data in the timebox to determine keywords for searching.

3. The method of claim 2, further comprising searching social media servers with the keywords determined in the timebox.

4. The method of claim 2, further comprising searching enterprise servers with the keywords determined in the timebox.

5. The method of claim 4, wherein the enterprise servers correspond to a host of the electronic conference;

wherein the keywords are utilized to search customer support databases and product ordering databases of the enterprise servers.

6. The method of claim 2, further comprising adding search results of the keywords, extracted from the timebox, to the package along with the extracted respective data.

7. The method of claim 1, wherein when the respective data of the meeting input sources is aligned according to the timestamps along the timeline, the timebox is a timeslice across the respective data and bound on the timeline by the beginning time and the ending time.

8. The method of claim 7, further comprising excluding any of the respective data not contained within the timebox to identify the extracted respective data.

9. The method of claim 1, wherein the respective data is input data that individually originates from different ones on the meeting input sources related to the electronic conference;

wherein the options of the criteria for the trigger further comprise:
a rapid exchange that comprises activity meeting a threshold during the electronic conference, and
determining that a number of participants dropped out of the electronic conference early.

10. The method of claim 1, wherein the meeting input sources for the electronic conference comprise a voice input source, a video input source, a text or chat input source, and a whiteboard input source.

11. A computer program product for providing a time data capsule for a designated time period in an electronic: conference, the computer program product comprising a non-transitory computer readable storage medium having program code embodied therewith, the program code executable by a computer to perform operations comprising:

identifying meeting input sources related to the electronic conference, wherein the meeting input sources for the electronic conference comprise a raising hand input source, a response to polling question input source, a slide presentation input source, and a show desktop input source;

capturing respective data of the meeting input sources from a start through an end of the electronic conference, at least one of maintaining and creating timestamps for the respective data that is captured, the timestamps associated with the respective data;

aligning by the computer the respective data of the meeting input sources along a timeline according to the timestamps respectively associated with the respective data from the meeting input sources;

converting the respective data of the meeting input sources into at least one of text equivalents and text descriptions with the timestamps retained;

identifying a trigger during the electronic conference that causes a timebox to be created, the timebox having a beginning time and an ending time;

wherein criteria for the trigger is set in advance; and wherein options of the criteria for the trigger comprise a positive emotion of a given participant, a negative emotion of the given participant, a problem verbally indicated by the given participant during the electronic conference, an interaction during the electronic conference by a person having a pre-identified role or name, and a positive commitment indicated during the electronic conference to take action by the given participant for a product order;

extracting the respective data of the meeting input sources for the timestamps that correspond to the timebox resulting in extracted respective data; and creating a package comprising the extracted respective data from the meeting input sources in which the extracted respective data occurred during the timebox initiated by the trigger.

12. The computer program product of claim 10, further comprising parsing the extracted respective data in the timebox to determine keywords for searching.

13. The computer program product of claim 12, further comprising searching social media servers with the keywords determined in the timebox.

14. The computer program product of claim 12, further comprising searching enterprise servers with the keywords determined in the timebox.

15. The computer program product of claim 14, wherein the enterprise servers correspond to a host of the electronic conference; and wherein the keywords are utilized to search customer support databases and product ordering databases of the enterprise servers.

16. The computer program product of claim 12, further comprising adding search results of the keywords, extracted from the timebox, to the package along with the extracted respective data.

17. The computer program product of claim 11, wherein when the respective data of the meeting input sources is aligned according to the timestamps along the timeline, the timebox is a timeslice across the respective data and bound on the timeline by the beginning time and the ending time.

18. The computer program product of claim 17, further comprising excluding any of the respective data not contained within the timebox to identify the extracted respective data.

19. The computer program product of claim 11, wherein the respective data is input data that individually originates from different ones on the meeting input sources related to the electronic conference.

20. An apparatus for providing a time data capsule of a designated time period in an electronic conference, the apparatus comprising:
   memory comprising computer-executable instructions; and
   a processor executing the computer-executable instructions, the computer-executable instructions, when executed by the processor, cause the processor to perform operations comprising:
   identifying meeting input sources related to the electronic conference, wherein the meeting input sources for the electronic conference comprise a raising hand input source, a response to polling question input source, a slide presentation input source, and a show desktop input source;
   capturing respective data of the meeting input sources from a start through an end of the electronic conference, at least one of maintaining and creating timestamps for the respective data that is captured, the timestamps associated with the respective data;
   aligning the respective data of the meeting input sources along a timeline according to the timestamps respectively associated with the respective data from the meeting input sources;
   converting the respective data of the meeting input sources into at least one of text equivalents and text descriptions with the timestamps retained;
   identifying a trigger during the electronic conference that causes a timebox to be created, the timebox having a beginning time and an ending time;
   wherein criteria for the trigger is set in advance; and
   wherein options of the criteria for the trigger comprise a positive emotion of a given participant, a negative emotion of the given participant, a problem verbally indicated by the given participant during the electronic conference, an interaction during the electronic conference by a person having a pre-identified role or name, and a positive commitment indicated during the electronic conference to take action by the given participant for a product order;
   extracting the respective data of the meeting input sources for the timestamps that correspond to the timebox resulting in extracted respective data; and
   creating a package comprising the extracted respective data from the meeting input sources in which the extracted respective data occurred during the timebox initiated by the trigger.

* * * * *